United States Patent
Sim et al.

(10) Patent No.: US 12,407,874 B2
(45) Date of Patent: *Sep. 2, 2025

(54) ENTROPY-CODING FOR VIDEO ENCODING AND DECODING

(71) Applicants: Hyundai Motor Company, Seoul (KR); Kia Corporation, Seoul (KR); Kwangwoon University Industry-Academic Collaboration Foundation, Seoul (KR)

(72) Inventors: Dong Gyu Sim, Seoul (KR); Sea Nae Park, Seoul (KR); Jong Seok Lee, Seoul (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,343

(22) Filed: Apr. 24, 2024

(65) Prior Publication Data

US 2024/0276026 A1    Aug. 15, 2024

Related U.S. Application Data

(63) Continuation of application No. 17/428,403, filed as application No. PCT/KR2020/010401 on Aug. 6, 2020, now Pat. No. 12,003,786.

(30) Foreign Application Priority Data

Aug. 6, 2019  (KR) .................. 10-2019-0095448
Aug. 9, 2019  (KR) .................. 10-2019-0097803
Aug. 6, 2020  (KR) .................. 10-2020-0098311

(51) Int. Cl.
*H04N 19/91* (2014.01)
*H04N 19/103* (2014.01)
(Continued)

(52) U.S. Cl.
CPC .......... *H04N 19/91* (2014.11); *H04N 19/103* (2014.11); *H04N 19/13* (2014.11); *H04N 19/186* (2014.11); *H04N 19/70* (2014.11)

(58) Field of Classification Search
CPC ...... H04N 19/91; H04N 19/103; H04N 19/13; H04N 19/186; H04N 19/70; H04N 19/136; H04N 19/184
See application file for complete search history.

(56) References Cited

U.S. PATENT DOCUMENTS 10,225,557 B2    3/2019   Lim et al.
11,336,918 B2 *  5/2022   Karczewicz ........... H04N 19/18
(Continued)

FOREIGN PATENT DOCUMENTS

WO    2013/109026 A1    7/2013
WO    2015/105890 A1    7/2015

*Primary Examiner* — Fabio S Lima
(74) *Attorney, Agent, or Firm* — Fox Rothschild LLP

(57) ABSTRACT

A method is executed to efficiently operate a bin buffer to limit a bin-to-bit ratio in entropy encoding and decoding related to bitstream generation and parsing. In addition, a method of configuring a list includes various entropy encoding/decoding methods and adaptively uses the entropy encoding/decoding methods for each basic unit of entropy encoding/decoding.

8 Claims, 11 Drawing Sheets

(51) Int. Cl.
*H04N 19/13* (2014.01)
*H04N 19/186* (2014.01)
*H04N 19/70* (2014.01)

(56) References Cited

U.S. PATENT DOCUMENTS

| | | | |
|---|---|---|---|
| 2012/0177131 A1* | 7/2012 | Matsuba | H04N 19/70 |
| | | | 375/E7.279 |
| 2012/0201294 A1* | 8/2012 | Segall | H04N 19/91 |
| | | | 375/240.02 |
| 2015/0195549 A1 | 7/2015 | Wang | |
| 2016/0330479 A1* | 11/2016 | Liu | H04N 19/176 |
| 2020/0244995 A1* | 7/2020 | Hsiang | H04N 19/13 |
| 2020/0322607 A1* | 10/2020 | Hsiang | H04N 19/13 |
| 2022/0360783 A1* | 11/2022 | Keating | H04N 19/174 |

* cited by examiner

ENTROPY-CODING FOR VIDEO ENCODING AND DECODING

CROSS-REFERENCE TO RELATED APPLICATIONS

This application is Continuation of U.S. Ser. No. 17/428,403, filed on Aug. 4, 2021, which is a National Phase application filed under 35 USC 371 of PCT International Application No. PCT/KR2020/010401 with an International Filing Date of Aug. 6, 2020, which claims under 35 U.S.C. § 119 (a) the benefit of Korean Patent Application No. 10-2019-0095448 filed on Aug. 6, 2019, Korean Patent Application No. 10-2019-0097803 filed on Aug. 9, 2019, and Korean Patent Application No. 10-2020-0098311 filed on Aug. 6, 2020, the entire contents of which are incorporated herein by reference.

BACKGROUND

(a) Technical Field

The present disclosure relates to encoding and decoding of a video, more particularly, to a method of efficiently operating a bin buffer and adaptively using various encoding/decoding methods in order to effectively perform entropy encoding and decoding.

(b) Description of the Related Art

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

In video encoding, entropy encoding is used to form a bitstream in which quantized transform coefficients, information on quantization parameters, intra-prediction or inter-prediction information according to a prediction type, information on block splitting, and the like are compressed. In addition, in video decoding, entropy decoding is used to parse the above-described information from the bitstream.

It would be desirable to provide an efficient entropy encoding/decoding method.

SUMMARY

The present disclosure provides a method of efficiently operating a bin buffer by restricting a bin-to-bit ratio in entropy encoding and decoding related to generation and parsing of a bitstream. In addition, the present disclosure provides a method of configuring a list including various entropy encoding/decoding methods and adaptively using an entropy encoding/decoding method for each basic unit of entropy encoding/decoding.

In accordance with one aspect of the present disclosure, a method for entropy decoding is executed by an video decoding apparatus, the method including receiving a bitstream formed by encoding a picture; performing an arithmetic decoding process to generate at least one bin string each including at least one bin by decoding the bitstream; and generating a syntax element through inverse binarization of the bin string, wherein the number of bins generated by decoding the bitstream satisfies a constraint that the number does not exceed a threshold, wherein the threshold is variably set according to a tier or level of an image.

In accordance with another aspect of the present disclosure, a method is provided for entropy encoding syntax elements generated according to predictive encoding of each block constituting a picture, the method including binarizing each of the syntax elements and generating at least one bin string each including at least one bin; performing an arithmetic coding process to generate encoded data from the bin string; and generating a bitstream configured with one or more network abstraction layer (NAL) units from the encoded data, wherein the number of bins relative to a length of the one or more NAL units is constrained not to exceed a threshold, wherein the threshold is variably set according to a tier or level of an image.

In accordance with another aspect of the present disclosure, an apparatus is provided for entropy decoding, including an arithmetic decoder configured to receive a bitstream formed by encoding a picture, and perform an arithmetic decoding process to generate at least one bin string each including at least one bin by decoding the bitstream; and an inverse binarizer configured to generate a syntax element through inverse binarization of the bin string, wherein the number of bins generated by decoding the bitstream satisfies a constraint that the number does not exceed a threshold, wherein the threshold is variably set according to a tier or level of an image.

As described above, according to the present disclosure, in entropy encoding and decoding related to generation and parsing of a bitstream, a method of efficiently operating a bin buffer may be provided, thereby making it possible to restrict the bin-to-bit ratio.

In addition, according to the present disclosure, in entropy encoding and decoding related to generation and parsing of a bitstream, a method of configuring a list including various entropy encoding/decoding methods and adaptively using an entropy encoding/decoding method for each basic unit of entropy encoding/decoding is provided. Accordingly, entropy encoding/decoding may be performed according to the application and signal characteristics.

DETAILED DESCRIPTION

Figure 1:
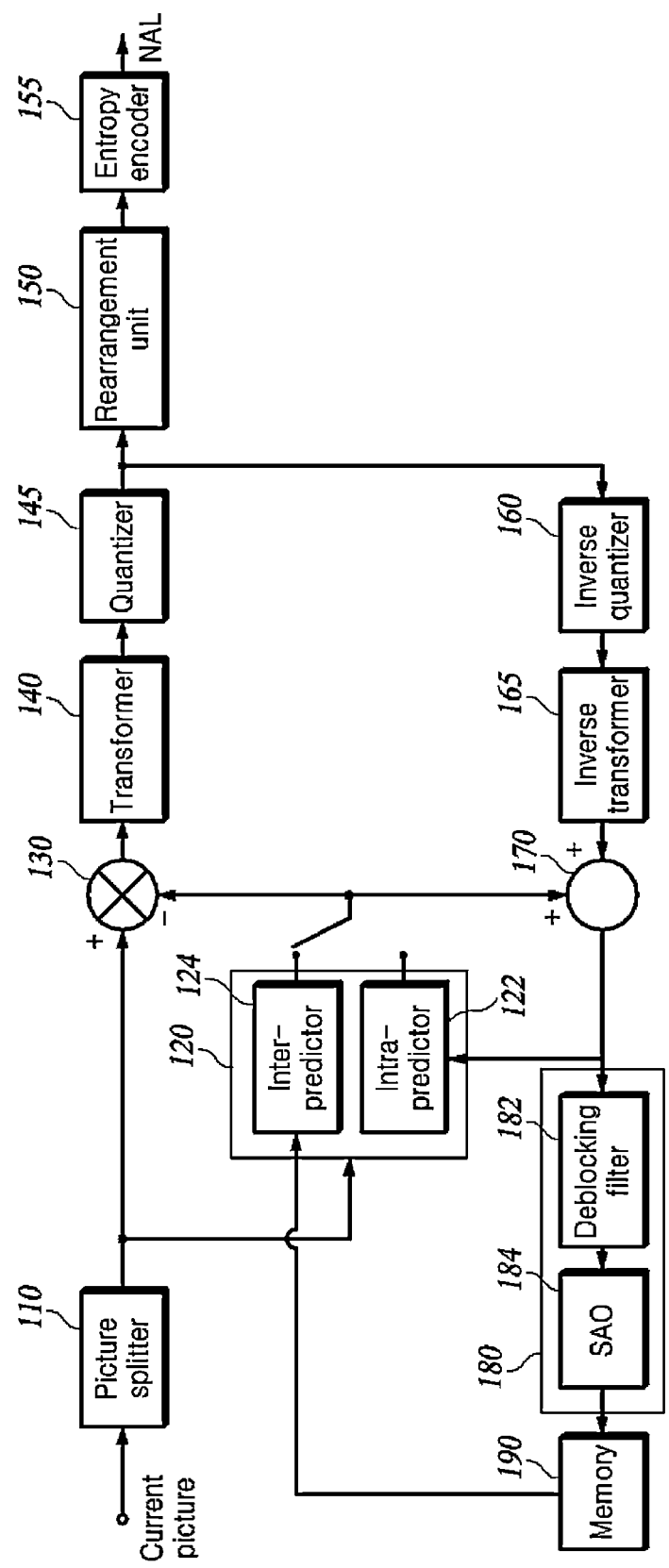
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of embodiments of the present disclosure, a detailed description of known functions and configurations incorporated herein will be omitted to avoid obscuring the subject matter of the embodiments.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video is composed of one or more sequences including a plurality of pictures. Each picture is split into a plurality of regions, and encoding is performed on each region. For example, one picture is split into one or more tiles or/and slices. The one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting one or more pictures is encoded in a picture parameter set (PPS) or a picture header. In addition, information referred to by one or more SPSs in common is encoded in a video parameter set (VPS). Furthermore, information which a plurality of pictures refers to in common is encoded in a sequence parameter set (SPS). In addition, information applied to one tile or tile group in common may be encoded as a syntax of a tile or tile group header. The syntaxes included in the SPS, PPS, slice header, and tile or tile group header may be referred to as high-level syntaxes.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size, and then recursively splits the CTUs using a tree structure. In the tree structure, a leaf node serves as a coding unit (CU), which is a basic unit of encoding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. BTTT may be collectively referred to as a multiple-type tree (MTT).

Figure 2:
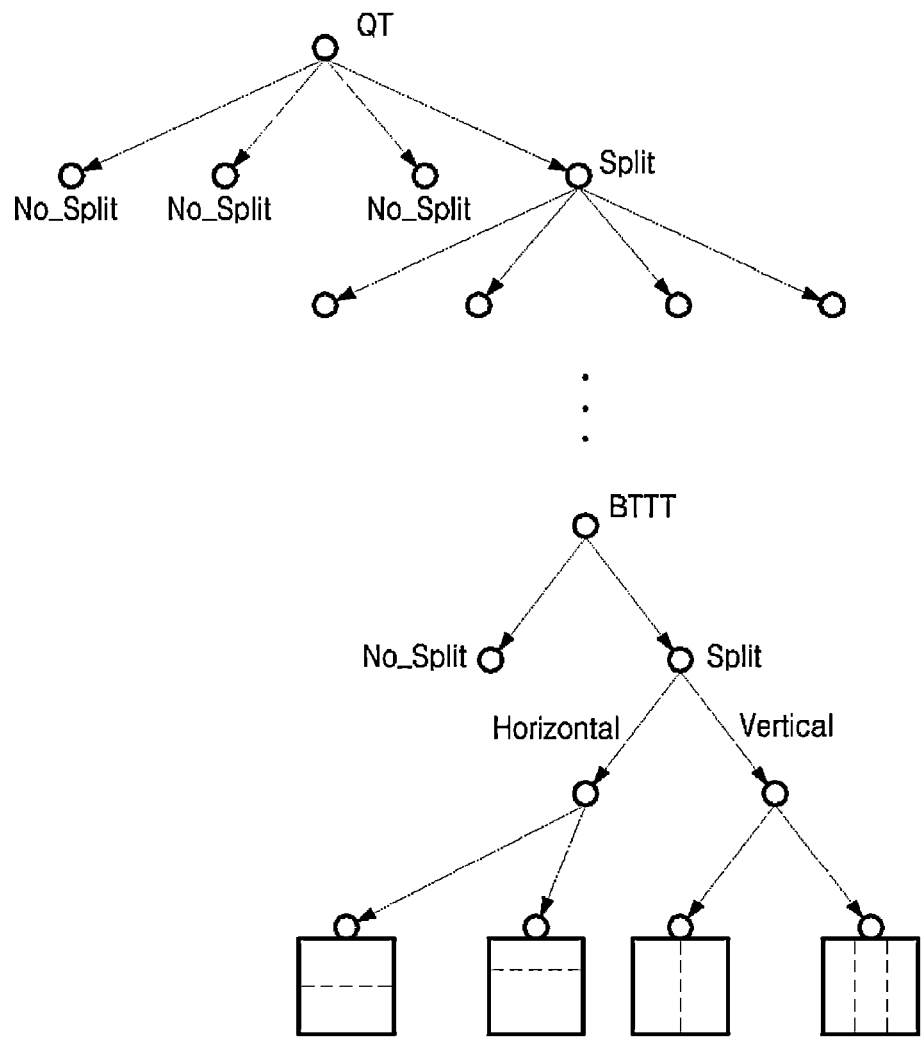
FIG. 2 exemplarily shows block partitioning structure using a QTBTTT structure.

FIG. 2 is a diagram illustrating a method for splitting a block using a QTBTTT structure.

As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus.

Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

In general, each of the current blocks in a picture may be predictively coded. In general, prediction of a current block may be performed using an intra-prediction technique (which uses data from a picture containing the current block) or an inter-prediction technique (which uses data from a picture coded before the picture containing the current block). The inter-prediction includes both unidirectional prediction and bi-directional prediction.

Figure 3A:
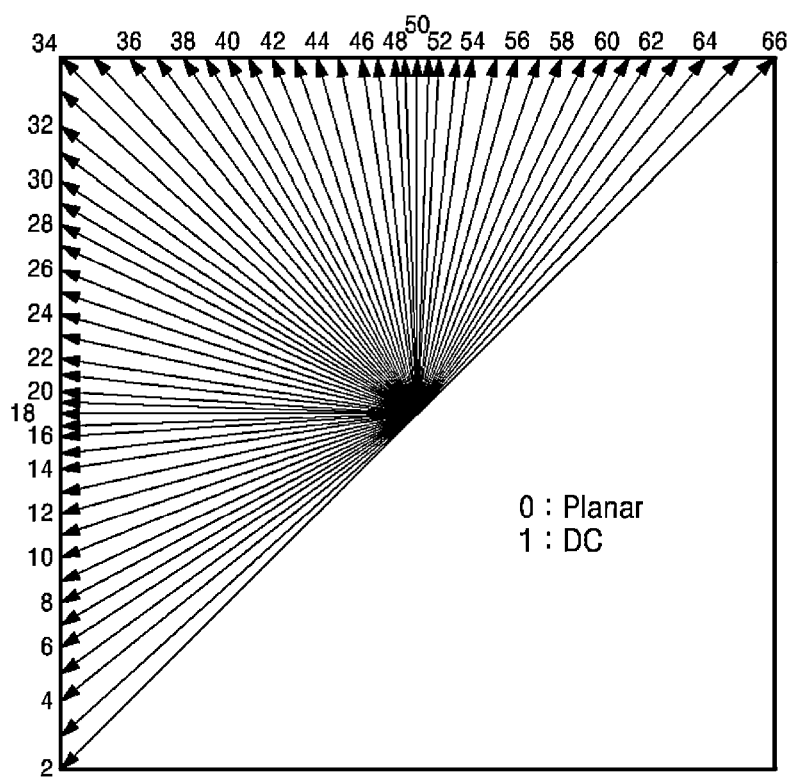
FIGS. 3A and 3B exemplarily show a plurality of intra-prediction modes including wide angle intra-prediction modes.

The intra-prediction unit 122 predicts pixels in the current block using pixels (reference pixels) positioned around the current block in the current picture including the current block. There is a plurality of intra-prediction modes according to the prediction directions. For example, as shown in FIG. 3A, the plurality of intra-prediction modes may include two non-directional modes, which include a planar mode and a DC mode, and 65 directional modes. Neighboring pixels and an equation to be used are defined differently for each prediction mode.

Figure 3B:
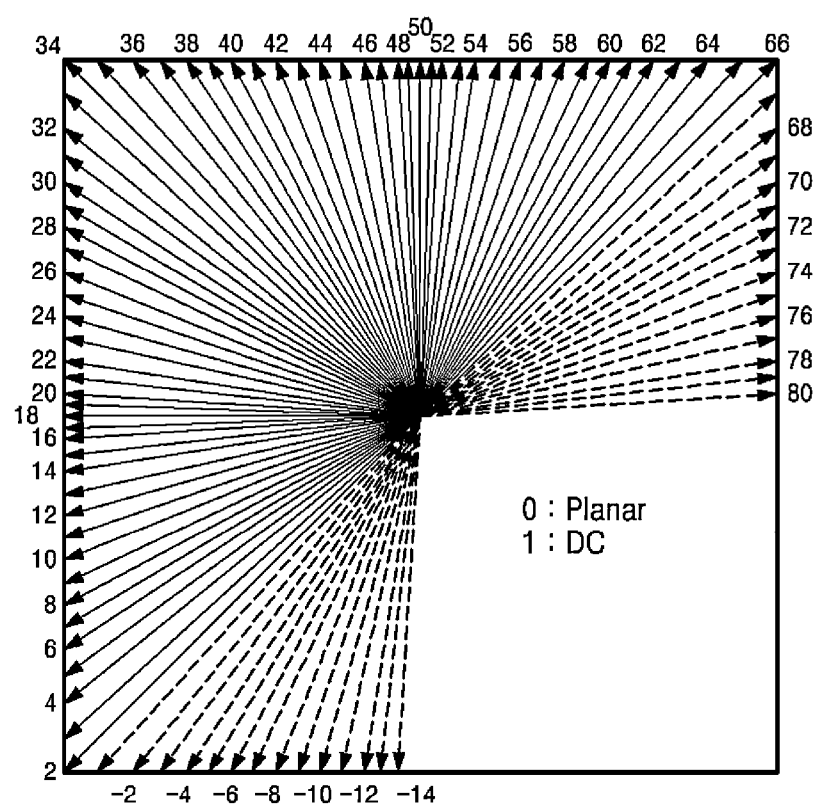

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In this case, among the wide angle intra-prediction modes, some wide angle intra-prediction modes available for the current block may be determined based on a ratio of the width and height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes−1 to −14) may be used when the current block has a rectangular shape with a width greater than the height thereof.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture which has been encoded and decoded earlier than the current picture, and generates a prediction block for the current block using the searched block. Then, the inter-predictor generates a motion vector (MV) corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The inter-predictor 124 may perform interpolation on a reference picture or a reference block in order to increase prediction accuracy. That is, subsamples between two consecutive integer samples are interpolated by applying filter coefficients to a plurality of consecutive integer samples including the two integer samples. When the operation of searching for a block most similar to the current block is performed on the interpolated reference picture, the motion vector may be expressed at a precision level of fractional sample unit, not a precision level of integer sample unit. The precision or resolution of the motion vector may be set differently for each target region to be encoded, for example, each unit such as a slice, tile, CTU, or CU. When such an adaptive motion vector resolution (AMVR) is applied, information about motion vector resolution to be applied to each target region should be signaled for each target region. For example, when the target region is a CU, information about the motion vector resolution applied to each CU is signaled. The information about the motion vector resolution may be information indicating the precision of a motion vector difference which will be described later.

The inter-predictor 124 may perform inter-prediction using bi-prediction. In bi-directional prediction, the inter-predictor 124 uses two reference pictures and two motion vectors representing block positions most similar to the current block in the respective reference pictures. The inter-predictor 124 selects a first reference picture and a second reference picture from reference picture list 0 (RefPicList0) and reference picture list 1 (RefPicList1), respectively, searches for blocks similar to the current block in the respective reference pictures, and generate a first reference block and a second reference block. Then, it generates a prediction block for the current block by averaging or weighting the first reference block and the second reference block. Then, it transfers motion information including information about the two reference pictures and the two motion vectors used to predict the current block to the encoder 120. RefPicList0 may be composed of pictures preceding the current picture in display order among the reconstructed pictures, and RefPicList1 may be composed of pictures following the current picture in display order among the reconstructed pictures. However, embodiments are not limited thereto. Pre-reconstructed pictures following the current picture in display order may be further included in RefPicList0, and conversely, and pre-reconstructed pictures preceding the current picture may be further included in RefPicList1.

Various methods may be used to minimize the number of bits required to encode the motion information.

For example, when the reference picture and motion vector of the current block are the same as the reference picture and motion vector of a neighboring block, the motion information about the current block may be transmitted to the video decoding apparatus by encoding information for identifying the neighboring block. This method is called a "merge mode."

In the merge mode, the inter-predictor 124 selects a predetermined number of merge candidate blocks (hereinafter referred to as "merge candidates") from among the neighboring blocks of the current block.

Figure 4:
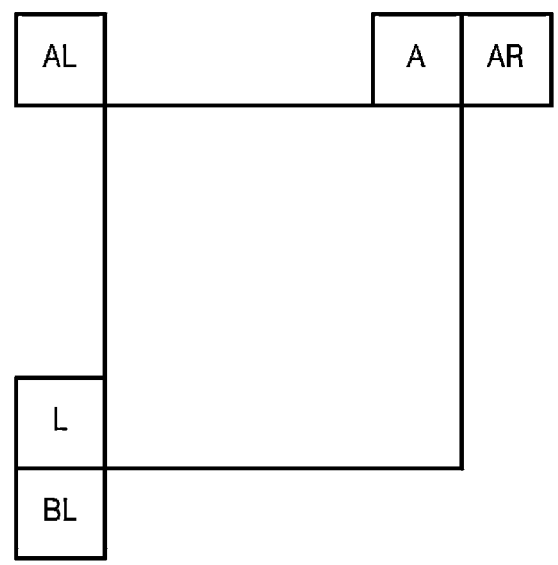
FIG. 4 exemplarily shows neighboring blocks around a current block.

As illustrated in FIG. 4, all or part of a left block L, an above block A, an above right block AR, a bottom left block BL, and an above left block AL, which are adjacent to the current block in the current picture, may be used as neighboring blocks for deriving merge candidates. In addition, a block located within a reference picture (which may be the same as or different from the reference picture used to predict the current block) other than the current picture in which the current block is located may be used as a merge candidate. For example, a co-located block which is at the same position as the current block or blocks adjacent to the co-located block in the reference picture may be additionally used as merge candidates.

The inter-predictor 124 configures a merge list including a predetermined number of merge candidates using such neighboring blocks. The inter-predictor 124 selects a merge candidate to be used as the motion information about the current block from among the merge candidates included in the merge list, and generates merge index information for identifying the selected candidates. The generated merge index information is encoded by the encoder 155 and transmitted to the video decoding apparatus.

Another method of encoding the motion information is an advanced motion vector prediction (AMVP) mode.

In the AMVP mode, the inter-predictor 124 derives predicted motion vector candidates for the motion vector of the current block by using neighboring blocks of the current block. All or part of the left block L, the above block A, the above right block AR, the bottom left block BL, and the above left block AL, which are adjacent to the current block in the current picture in FIG. 2, may be used as the neighboring blocks used to derive the predicted motion vector candidates. In addition, a block positioned within a reference picture (which may be the same as or different from the reference picture used to predict the current block) other than the current picture including the current block may be used as the neighboring blocks used to derive the predicted motion vector candidates. For example, a co-located block which is at the same position as the current block or blocks adjacent to the collocated block in the reference picture may be used.

The inter-predictor 124 derives predicted motion vector candidates using the motion vectors of the neighboring blocks, and determines a predicted motion vector for the motion vector of the current block using the predicted motion vector candidates. Then, a motion vector difference is calculated by subtracting the predicted motion vector from the motion vector of the current block.

The predicted motion vector may be obtained by applying a predefined function (e.g., a function for calculating a median, an average, or the like) to the predicted motion vector candidates. In this case, the video decoding apparatus also knows the predefined function. Since the neighboring blocks used to derive the predicted motion vector candidates have already been encoded and decoded, the video decoding apparatus already knows the motion vectors of the neighboring blocks as well. Accordingly, the video encoding apparatus does not need to encode information for identifying the predicted motion vector candidates. Therefore, in this case, the information about the motion vector difference and the information about the reference picture used to predict the current block are encoded.

The predicted motion vector may be determined by selecting any one of the predicted motion vector candidates. In this case, information for identifying the selected predicted motion vector candidate is further encoded along with the information about the motion vector difference and the information about the reference picture which are to be used to predict the current block.

The subtractor 130 subtracts the prediction block generated by the intra-predictor 122 or the inter-predictor 124 from the current block to generate a residual block.

The transformer 140 transforms the residual signal in the residual block having pixel values in the spatial domain into transform coefficients in the frequency domain. The transformer 140 may transform residual signals in the residual block using the entire size of the residual block as a transformation unit. Alternatively, it may split the residual block into a plurality of subblocks, and perform the transformation using the subblock as a transform unit. Alternatively, the residual signals may be transformed by dividing the block into two subblocks, which are a transform region and a non-transform region, and using only the transform region subblock as a transform unit. The transform region subblock may be one of two rectangular blocks having a size ratio of 1:1 based on the horizontal axis (or vertical axis). In this case, a flag (cu_sbt_flag) indicating that only subblocks have been transformed, directionality (vertical/horizontal) information (cu_sbt_horizontal_flag) and/or position information (cu_sbt_pos_flag) are encoded by the entropy encoder 155 and signaled to the video decoding apparatus. In addition, the size of the transform region subblock may have a size ratio of 1:3 based on the horizontal axis (or vertical axis). In this case, a flag (cu_sbt_quad_flag) distinguishing the corresponding splitting is additionally encoded by the entropy encoder 155 and signaled to the video decoding apparatus.

The transformer 140 may transform the residual block in the horizontal direction and the vertical direction individually. For transformation, various types of transform functions or transform matrices may be used. For example, pairs of transform functions for horizontal transformation and vertical transformation may be defined as a multiple transform set (MTS). The transformer 140 may select one pair of transform functions having the best transformation efficiency in the MTS, and transform the residual block in the horizontal and vertical directions, respectively. The information (mts_idx) on the transform function pair selected in the MTS is encoded by the entropy encoder 155 and signaled to the video decoding apparatus.

The quantizer 145 quantizes transform coefficients output from the transformer 140 using quantization parameters, and outputs the quantized transform coefficients to the entropy encoder 155. For some blocks or frames, the quantizer 145 may directly quantize a related residual block without transformation. The quantizer 145 may apply different quantization coefficients (scaling values) according to the positions of the transform coefficients in a transform block. A matrix of quantized coefficients applied to the two-dimensionally arranged quantized transform coefficients may be encoded and signaled to the video decoding apparatus.

The rearrangement unit 150 may re-sort the coefficient values for the quantized residual value.

The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. That is, a scan mode to be used may be determined among the zig-zag scan, the diagonal scan, the vertical scan and the horizontal scan according to the size of the transformation unit and the intra-prediction mode.

The entropy encoder 155 encodes the one-dimensional quantized transform coefficients output from the rearrangement unit 150 using uses various encoding techniques such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction, and encodes intra-prediction information (i.e., information about an intra-prediction mode) or inter-prediction information (a merge index for the merge mode, information about a reference picture index and a motion vector difference for the AMVP mode) according to the prediction type. The entropy encoder 155 also encodes information related to quantization, that is, information about quantization parameters and information about a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The loop filter unit 180 filters the reconstructed pixels to reduce blocking artifacts, ringing artifacts, and blurring artifacts generated due to block-based prediction and transformation/quantization. The loop filter unit 180 may include at least of a deblocking filter 182, a sample adaptive offset (SAO) filter 184, and an adaptive loop filter (ALF) 186.

The deblocking filter 182 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed sample and an original sample caused by lossy coding, and performs filtering in a manner that adding a corresponding offset to each reconstructed sample. The ALF 186 performs filtering on a target sample to be filtered by applying filter coefficients to the target sample and neighboring samples of the target sample. The ALF 186 may divide the samples included in a picture into predetermined groups, and then determine one filter to be applied to a corresponding group to differentially perform filtering on each group. Information about filter coefficients to be used for the ALF may be encoded and signaled to the video decoding apparatus.

The reconstructed blocks filtered by the loop filter unit 180 are stored in the memory 190. Once all blocks in one picture are reconstructed, the reconstructed picture may be used as a reference picture for inter-prediction of blocks in a picture to be encoded next.

Figure 5:
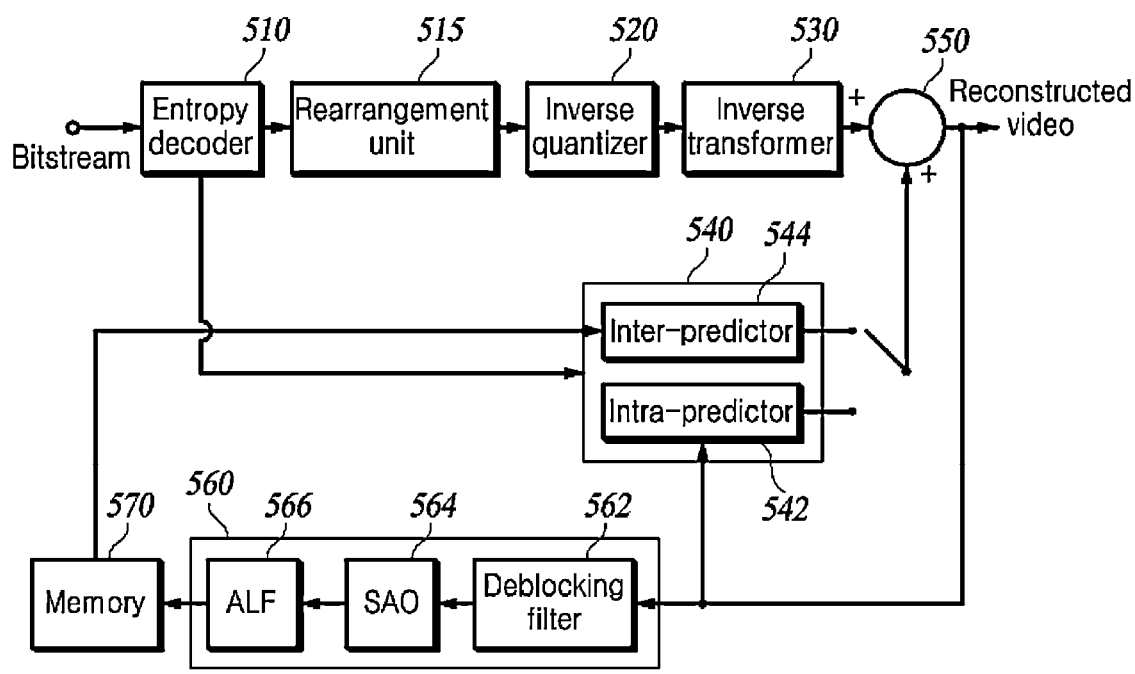
FIG. 5 is an exemplary block diagram of a video decoding apparatus capable of implementing the techniques of the present disclosure.

FIG. 5 is an exemplary functional block diagram of a video decoding apparatus capable of implementing the techniques of the present disclosure. Hereinafter, the video decoding apparatus and elements of the apparatus will be described with reference to FIG. 5.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 510 determines a current block to be decoded by decoding a bitstream generated by the video encoding apparatus and extracting information related to block splitting, and extracts prediction information and information about a residual signal, and the like required to reconstruct the current block.

The entropy decoder 510 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 510 extracts information about a prediction type indicating whether the current block is intra-predicted or inter-predicted. When the prediction type information indicates intra-prediction, the entropy decoder 510 extracts a syntax element for the intra-prediction information (intra-prediction mode) for the current block. When the prediction type information indicates inter-prediction, the entropy decoder 510 extracts a syntax element for the inter-prediction information, that is, information indicating a motion vector and a reference picture referred to by the motion vector.

The entropy decoder 510 also extracts information about quantized transform coefficients of the current block as information related to quantization and information about residual signals.

The rearrangement unit 515 may change the sequence of the one-dimensional quantized transform coefficients entropy-decoded by the entropy decoder 510 to a 2-dimensional coefficient array (i.e., block) in a reverse order of the coefficient scanning performed by the video encoding apparatus.

The inverse quantizer 520 inversely quantizes the quantized transform coefficients, and inversely quantizes transform coefficients quantized using the quantization parameter. The inverse quantizer 520 may apply different quantization coefficients (scaling values) to the quantized transform coefficients arranged in two dimensions. The inverse quantizer 520 may perform inverse quantization by applying a matrix of quantization coefficients (scaling values) from the video encoding apparatus to a two-dimensional array of quantized transform coefficients.

The inverse transformer 530 inversely transforms the inversely quantized transform coefficients from the frequency domain to the spatial domain to reconstruct residual signals, thereby generating a residual block for the current block.

In addition, when the inverse transformer 530 inversely transforms only a partial region (subblock) of the transform block, it extracts a flag (cu_sbt_flag) indicating that only the subblock of the transform block has been transformed, the directionality (vertical/horizontal) information about the subblock (cu_sbt_horizontal_flag), and/or position information about the subblock (cu_sbt_pos_flag), and inversely transforms the transform coefficients of the subblock from the frequency domain to the spatial domain. Then, it reconstructs residual signals, and fills a region that is not inversely transformed with the value of "0" as a residual block, thereby generating the final residual block for the current block.

In addition, when the MTS is applied, the inverse transformer 530 determines transform functions or transform matrices to be applied in the horizontal and vertical directions, respectively, using the MTS information (mts_idx) signaled from the video encoding apparatus, and uses the determined transform functions to inversely transform the transform coefficients in the transform block in the horizontal and vertical directions.

The predictor 540 may include an intra-predictor 542 and an inter-predictor 544. The intra-predictor 542 is activated when the prediction type of the current block is intra-prediction, and the inter-predictor 544 is activated when the prediction type of the current block is inter-prediction.

The intra-predictor 542 determines an intra-prediction mode of the current block among a plurality of intra-prediction modes based on the syntax element for the intra-prediction mode extracted from the entropy decoder 510, and predicts the current block using the reference pixels around the current block according to the intra-prediction mode.

The inter-predictor 544 determines a motion vector of the current block and a reference picture referred to by the motion vector using the syntax element for the intra-prediction mode extracted from the entropy decoder 510, and predicts the current block based on the motion vector and the reference picture.

The adder 550 reconstructs the current block by adding the residual block output from the inverse transformer 530 and the prediction block output from the inter-predictor 544 or the intra-predictor 542. The pixels in the reconstructed current block are used as reference pixels in intra-predicting a block to be decoded next.

The loop filter unit 560 may include a deblocking filter 562, an SAO filter 564, and an ALF 566. The deblocking filter 562 deblocking-filters the boundary between the reconstructed blocks to remove blocking artifacts caused by block-by-block decoding. The SAO filter 564 performs additional filtering on the reconstructed block after deblocking filtering to compensate for a difference between the reconstructed pixel and the original pixel caused by lossy coding. The ALF 566 performs filtering on a target sample to be filtered by applying filter coefficients to the target sample and neighboring samples of the target sample. The ALF 566 may divide the samples in a picture into predetermined groups, and then determine one filter to be applied to a corresponding group to differentially perform filtering on each group. The filter coefficient of the ALF is determined based on the information about the filter coefficient decoded from the bitstream.

The reconstructed block filtered by the loop filter unit 560 is stored in the memory 570. When all blocks in one picture are reconstructed, the reconstructed picture is used as a reference picture for inter-prediction of blocks in a picture to be encoded next.

The present disclosure is directed to encoding and decoding of a video as described above. More specifically, the present disclosure provides a method of efficiently operating a bin buffer by restricting a bin-to-bit ratio in entropy encoding and decoding related to bitstream generation and parsing. In addition, it provides a method of configuring a list including various entropy decoding methods and adaptively using an entropy encoding/decoding method for each basic unit of entropy encoding/decoding.

The video encoding apparatus generates a bitstream composed of one or multiple consecutive Network Abstraction Layer (NAL) units, using the above-described encoding operation. The NAL unit includes a NAL unit header and a raw byte sequence payload (RBSP), and the RBSP includes SODB (String Of Data Bits). The SODB corresponds to encoded video data or video parameters.

The NAL unit may be classified into a video coding layer (VCL) NAL type or a non-VCL type. Parameters for video decoding may be included the NAL unit of the non-VCL type in an encoded state. In addition, data related to a video signal may be included in the NAL unit of the VCL type in the encoded state.

The NAL unit is generated by the entropy encoder 155 in a video encoding apparatus. In particular, a context-based adaptive binary arithmetic coding (CABAC) algorithm is used as an arithmetic decoding process to generate an encoded video signal included in the NAL unit of the VCL type. The CABAC algorithm is a method for binary arithmetic coding a symbol using previously coded/decoded statistical information. The symbol is a value represented as a binary number having a value which is 0 or 1. One bin in a bin string formed by binarization of zero or a larger number may be a symbol. The symbol itself may mean a syntax element required for one video decoding. The context of the CABAC algorithm refers to statistical information about previously coded/decoded symbols, and is used to improve prediction performance for later symbols. A compression rate, which is the encoding performance of the CABAC algorithm, depends on a context modeling method. As the probability of the most probable symbol (MPS) of the context model increases, the compression rate may be improved.

Other entropy encoding schemes are used to generate encoded parameters included in the non-VCL type NAL unit or the VCL type NAL unit, but further detailed description thereof will be omitted because they are not related to the scope of the present disclosure.

In the following, various methods for maintaining a constraint on the bin-to-bit ratio in order to efficiently manage the bin buffer are proposed.

Figure 6:
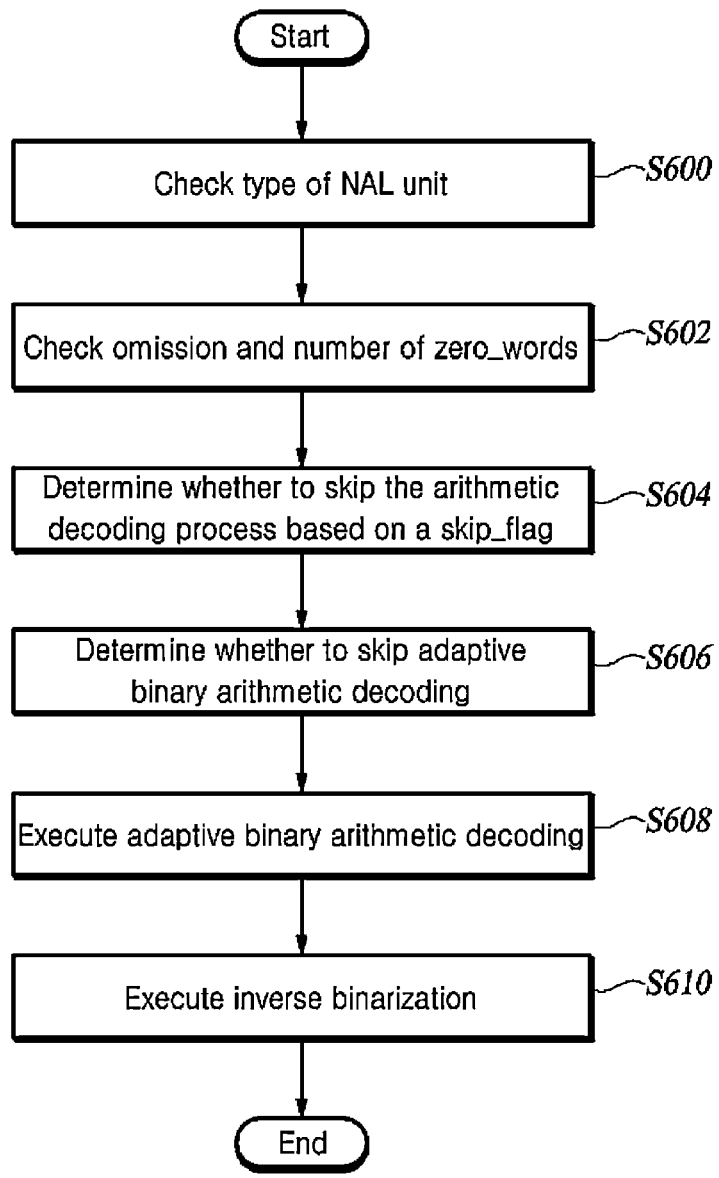
FIG. 6 is a flowchart of a method for entropy decoding according to an embodiment of the present disclosure.

FIG. 6 is a flowchart of a method for entropy decoding according to an embodiment of the present disclosure. While various methods S602, S604, and S606 for maintaining the constraint on the bin-to-bit ratio are sequentially shown in FIG. 6, the present disclosure is not necessarily limited thereto, and one or more methods may be used to maintain the constraint on the bin-to-bit ratio.

The entropy decoder 510 of the video decoding apparatus according to the present disclosure may decode a VCL type NAL unit based on the arithmetic decoding process.

The entropy decoder 510 checks the type of the NAL unit from the bitstream (S600). The type of the NAL unit may be identified by parsing the NAL unit header, and the following process is continued for the NAL units of the VCL type.

The entropy decoder 510 checks the number of zero_words (S602).

The entropy decoder 510 checks the number of zero_words included in the VCL type NAL unit in order to efficiently manage the bin buffer. The bin buffer may include a buffer for storing a bin string and a buffer used by the entropy decoder 510 in the decoding process.

In order for the entropy decoder 510 to efficiently manage the bin buffer to cope with buffer overrun/underrun, the entropy encoder 155 of the video encoding apparatus may determine the number of zero_words and add one or more zero_words of a predefined length in generating a VCL-type NAL unit. The number of zero_words may be adaptively determined according to at least one of the length of the NAL unit, the length of the bin string, the horizontal and vertical size information about an image, the bit-depth, the color space sampling information, the temporal identifier (TID), a quantization parameter (QP), or the like. That is, when the ratio of the number (or length) of bins to the number (or length) of generated bits exceeds a threshold, the entropy encoder 155 generates a NAL unit by inserting one or more zero_words of a predefined length in order to maintain the constraint on the bin-to-bit ratio. The threshold may be determined according to at least one of the length (number of bits) of the NAL unit, horizontal and vertical size information of a picture, bit depth, color space sampling information (a sampling ratio between the luma component and the chroma component), a TID, a QP, or the like. Alternatively, as described below, the threshold may be variably determined according to a tier or level of an image.

In order to improve efficiency in the encoding/decoding process, the entropy encoder 155 may perform video encoding using at least one of a method of omitting the zero_word or a method of adaptively determining the length of the zero_words. The entropy decoder 510 checks whether zero_word is omitted and the number of zero_words in the NAL unit, and generates a bitstream for execution of entropy decoding by removing the zero_words from the NAL unit. Also, the size of the bin buffer for applying the arithmetic decoding process to the bitstream may be set with reference to the number of zero-words. The entropy decoder 510 may adaptively maintain and manage the buffer according to the set size of the bin buffer. The entropy decoder 510 generates a bin string by applying the arithmetic decoding process to the bitstream, and then stores the same in the bin buffer. The arithmetic decoding process executed by the video decoding apparatus may include a context-based adaptive binary arithmetic decoding (hereinafter referred to as "adaptive binary arithmetic decoding") process, and/or binary arithmetic decoding process based on uniform probability as a bypass mode.

In some embodiments, the constraint on the bin-to-bit ratio may be achieved using the method of selectively skipping the arithmetic decoding process.

The entropy decoder 510 determines whether to skip the arithmetic decoding process based on a skip_flag (S604).

The entropy decoder 510 may determine whether to perform adaptive binary arithmetic decoding or binary arithmetic decoding for the bitstream according to a preset order. To make the determination, the skip_flag indicating whether the arithmetic decoding process is skipped may be signaled at the high level. The high level may be an SPS, PPS, CTU, VPDU, a sharing unit, or the like that precedes the decoding time of the current unit. Alternatively, it may be determined based on the skip_flag of one or more units that are spatially, temporally, or hierarchically neighbored to the current unit. Alternatively, it may be determined based on the skip_flag of units having different color spaces at the same position as the current unit. Alternatively, syntax elements for which application of the arithmetic decoding process is skipped may be determined based on previously acquired statistics. Alternatively, the application of an arithmetic decoding process may be skipped for some syntax elements according to an agreement between the video encoding apparatus and the video decoding apparatus. For reference, when the skip_flag is signaled, the video decoding apparatus may generate a bin string directly from the bitstream without applying the arithmetic decoding process to the bitstream.

In some other embodiments, the constraint on the bin-to-bit ratio may be achieved through a method of adaptively switching between the adaptive binary arithmetic decoding and the uniform probability based binary arithmetic decoding.

The entropy decoder 510 determines whether to skip the adaptive binary arithmetic decoding by a comparison between the length of the previously decoded bin string and a threshold (S606).

When the length of the decoded bin string exceeds a preset threshold, the entropy decoder 510 skips the adaptive binary arithmetic decoding and performs the binary arithmetic decoding.

Alternatively, adaptive switching between the adaptive binary arithmetic decoding and the uniform probability based binary arithmetic decoding may be implemented using a counter. For example, when the bin-to-bit ratio is maintained at N/M, reading one bit increases the counter value by N (where N is a natural number), and decoding one bin decreases the same by M (where M is a natural number). For example, when the value of the counter becomes larger than N, the adaptive binary arithmetic decoding may be performed. In the opposite case, the binary arithmetic decoding, which is a bypass mode, may be performed. The counter may be calculated and initialized based on at least one or a plurality of pieces of information of the image/slice/tile/brick/CTU size, the bit depth, and color space sampling, or the like.

The threshold (or N and M) may be transmitted from the video encoding apparatus through one of SPS/PPS/SLICE/CTU/VPDU/CU units. Alternatively, it may be set for each layer unit according to an agreement between the video encoding apparatus and the video decoding apparatus. Alternatively, it may be determined by the video decoding apparatus based on a picture/slice/brick/tile/CTU size, bit depth, color space sampling, prediction mode, transform mode, intra-prediction mode, inter-prediction mode, and the like. Furthermore, it may be determined in consideration of a tier and/or level of an image. That is, the threshold (or M and N) may be variably set according to the tier and/or level of the image. Alternatively, a ratio between N and M in the current unit may be calculated based on N and M of one or more units around the current unit or a ratio thereof. Alternatively, N and M for one or more of the previous units may be stored and managed in a first-in first-out (FIFO) type look-up table, and N and M corresponding to the index transmitted from the video encoding apparatus may be used by the video decoding apparatus.

In another embodiment of the present disclosure, when a threshold or a counter is not available, the entropy decoder 510 may determine whether to skip the adaptive binary arithmetic decoding according to an agreement between the video encoding apparatus and the video decoding apparatus for each layer unit, syntax element, or bin constituting the syntax element. In this case, the agreement between the video encoding apparatus and the video decoding apparatus may be expressed in the form of a lookup table.

The entropy decoder 510 executes the adaptive binary arithmetic decoding (S608).

The entropy decoder 510 may decode a bin to which the adaptive binary arithmetic decoding is applied. Details of the adaptive binary arithmetic decoding process will be described later with reference to FIG. 7.

The entropy decoder 510 executes inverse binarization (S610).

By executing the inverse binarization, the entropy decoder 510 may generate, from the bin string, values of syntax elements representing a video signal.

Figure 7:
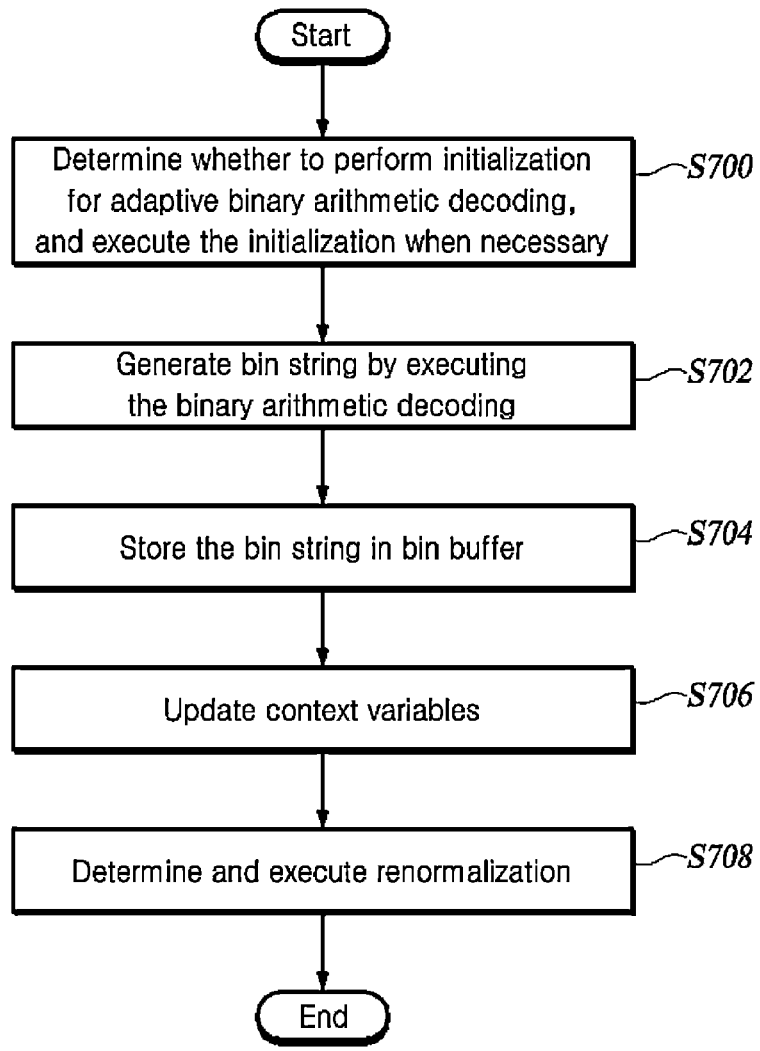
FIG. 7 is a flowchart of an adaptive binary arithmetic decoding process according to an embodiment of the present disclosure.

FIG. 7 is a flowchart of an adaptive binary arithmetic decoding process according to an embodiment of the present disclosure.

FIG. 7 is a detailed flowchart of the adaptive binary arithmetic decoding process (operation S608) executed by the entropy decoder 510 of the video decoding apparatus.

The entropy decoder 510 determines whether to perform initialization for the adaptive binary arithmetic decoding, and executes the initialization when necessary (S700).

First, when a syntax element to be decoded is a first syntax element of a slice/tile, the initialization operation for the adaptive binary arithmetic decoding may be executed. In this case, an operation of initializing variables pStateIdx0 and pStateIdx1 representing the context model and an operation of initializing variables ivlCurrRange and ivlOffset representing the decoding state may be both executed.

In addition, when the current CTU is the first CTU of a row included in the tile, and there is a spatial neighboring block in order to refer to the value of a variable representing the context model, only the initialization operation for variables indicating the decoding state is executed. On the other hand, when there is no such spatial neighboring block, an operation of initializing both the context model and the variables indicating the decoding state may be executed.

Here, the context models pStateIdx0 and pStateIdx1 for each syntax element may be probability models for most probable symbols (MPS), and may have different accuracies and adaptation rates. The context models for each syntax element may be initialized based on the initial value of the probability for the MPS and the QP of the current unit. The initial value of the probability for the MPS may be acquired from ctxTable, which is a lookup table for each syntax element, using ctxIdx according to the prediction mode of the current unit. The ctxTable for each syntax element is a lookup table set according to an agreement between the video encoding apparatus and the video decoding apparatus, and provides an initial probability value for the MPS according to ctxIdx, and shiftIdx which is used in the context model update operation. ctxIdx is given as the sum of ctxInc and ctxIdxOffset, where ctxIdxOffset is a value dependent on the prediction mode, and ctxInc may be calculated based on various information such as syntax of neighboring blocks, the depth of a CU, and the size of transform.

The variable ivlCurrRange, which indicates the state of the adaptive binary arithmetic decoding, represents the current section for decoding, and ivlOffset is an offset of a preset length acquired from the compressed bitstream and represents a position within ivlCurrRange. In the initialization operation for the variables indicating the state of decoding, ivlCurrRange may be initialized to a preset value (e.g., 510). Alternatively, the ivlCurrRange may be calculated based on a bit depth for a dynamic range representing a probability. ivlOffset may be initialized to the value of n bits (n is a natural number) which are acquired from the bitstream. As provided herein, n may be determined based on the length of ivlCurrRange or may be signaled from the video encoding apparatus.

In the binary arithmetic decoding, decoding may be executed by repeating an operation of dividing a section corresponding to the length of ivlCurrRange into two sections. For two probability values p0 and p1 (where p1=1−p0), the section of ivlCurrRange may be divided into two sections whose lengths are p0×ivlCurrRange and (1−p0)×ivlCurrRange. One of the two sections may be selected according to the bin value generated by the binary arithmetic decoding.

The entropy decoder 510 generates a bin string by executing the binary arithmetic decoding (S702).

The entropy decoder 510 may execute the binary arithmetic decoding process as part of the adaptive binary arithmetic decoding process. The entropy decoder 510 may update ivlCurrRange and ivlOffset using context models pStateIdx0 and pStateIdx1 for each syntax element, and generate a bin. First, ivlCurrRange is updated as shown in Equations 1 to 3.

$$qRangeIdx = ivlCurrRange \gg a \quad \text{[Equation 1]}$$

$$pState = pStateIdx1 + b * pStateIdx0$$

$$valMps = pState \gg c$$

$$ivlLpsRange = (qRangeIdx * \quad \text{[Equation 2]}$$

$$((valMps?(c+1) - pState: pState) \gg (c-a)) \gg 1) + d$$

$$ivlCurrRange = ivlCurrRange - ivlLpsRange \quad \text{[Equation 3]}$$

Here, a, b, c, and d are all natural numbers, and c is a natural number greater than a. qRangeIdx has a value obtained by dividing ivlCurrRange, which is the current section, by (1<<a), and may denote an index for a detailed section. As described above, the two context models pStateIdx0 and pStateIdx1 are probability models for MPS, each having an accuracy of (c-b) bits and c bits. As shown in Equation 1, using the probability values of the two probability models, pState, which is the probability value of the current state, may be calculated, and the MPS value may be determined from the probability value of the current state. In addition, as shown in Equation 2, after the section length ivlLpsRange of the least probable symbol (LPS) is calculated, ivlCurrRange, the length of the current section may be updated using Equation 3.

A bin value may be determined based on the updated ivlCurrRange and ivlOffset. When ivlOffset is greater than or equal to ivlCurrRange, the bin value is determined as an LPS value (!(MPS value)), and ivlOffset and ivlCurrRange are updated as shown in Equation 4.

$$ivlOffset = ivlOffset - ivlCurrRange \quad \text{[Equation 4]}$$

$$ivlCurrRange = ivlLpsRange$$

On the other hand, when ivlOffset is less than ivlCurrRange, the bin value is determined as the MPS value, and updating ivlOffset and ivlCurrRange is skipped. The determined bin values may form a bin string.

The entropy decoder 510 stores the bin string in the bin buffer (S704). As described above, the entropy decoder 510 may decode a value of a syntax element representing a video signal from the bin values stored in the bin buffer, using the inverse binarization process S610.

The entropy decoder 510 updates the context variables (S706).

In order to update the context variables, the entropy decoder 510 may calculate adaptation rates, shift0 and shift1, for the two probability models using shiftIdx, as shown in $$shift0 = (shiftIdx \gg e) + f \quad \text{[Equation 5]}$$

$$shift1 = (shiftIdx \& g) + h + shift0$$

Here, e, f, g, and h are all natural numbers.

The entropy decoder 510 may update the two probability models pStateIdx0 and pStateIdx1 using the adaptation rates as shown in Equations 6 and 7.

$$pStateIdx0 = \min(pStateIdx0 - \quad \text{[Equation 6]}$$

$$(pStateIdx0 \gg shift0) + ((1 \ll (c-b)) * bin \gg shift0), pMax0)$$

$$pStateIdx1 = \min(pStateIdx1 - \quad \text{[Equation 7]}$$

$$(pStateIdx1 \gg shift1) + ((1 \ll c) * bin \gg shift1), pMax1)$$

Here, the min(x,y) function is a function that outputs the smaller value of x and y, and pMax0 and pMax1 are the maximum probability values that the probability models may have. Therefore, by allowing the probability value of each probability model to be clipped to the maximum value using the min(x,y) function, the adaptive binary arithmetic coding/decoding process according to the present embodiment efficiently limit the number of bins and operate the bin buffer, compared to the bypass mode.

pMax0 and pMax1 may be transmitted from the video encoding apparatus. Alternatively, they may be determined, calculated, or derived using a lookup table based on shiftIdx. Alternatively, only one of pMax0 and pMax1 may be signaled, and pMax1 may be calculated based on pMax0 or pMax0 may be calculated based on pMax1. Alternatively, pMax0 and pMax1 may be values predetermined according to an agreement between the video encoding apparatus and the video decoding apparatus. Alternatively, pMax0 and pMax1 of the current unit may be calculated based on pMax0 and pMax1 of previous units in order of encoding and decoding. Alternatively, pMax0 and pMax1 of the current unit may be calculated based on pMax0 and pMax1 of units at the same position as the current unit in one or multiple color spaces.

The entropy decoder 510 determines and executes renormalization (S708).

The entropy decoder 510 may execute the renormalization when the length of the updated ivlCurrRange is less than a preset threshold T. The threshold T may be transmitted from the video encoding apparatus. Alternatively, the threshold T may be derived using high level information. Alternatively, the threshold T may be derived from one or a multiple neighboring units. In executing the renormalization operation, the entropy decoder 510 doubles the length of the ivlCurrRange and attaches 1 bit acquired from the bitstream to the least significant bit (LSB) of the ivlOffset.

When the adaptive binary arithmetic decoding is skipped, the entropy decoder 510 may execute the binary arithmetic decoding as a bypass mode. In the binary arithmetic decoding process, the probability value for MPS is set to 0.5, and accordingly the most significant bit (MSB) of ivlOffset may be determined as a bin value.

Entropy decoding has been mainly described above. Since entropy encoding corresponds to a reverse process of entropy decoding, a detailed description of the entropy encoding will be skipped. In addition, the above-described methods of maintaining a constraint on the bin-to-bit ratio in order to efficiently operate a bin buffer may be applied even to entropy encoding.

As described above, according to the present embodiment, by providing a method of efficiently operating a bin buffer in entropy encoding and decoding related to bitstream generation and parsing, the bin-to-bit ratio may be restricted.

In an aspect of the present disclosure, the video encoding/decoding apparatus may configure a list including various entropy encoding/decoding methods, and adaptively use the entropy encoding/decoding methods for each basic unit of entropy encoding/decoding.

In the method for entropy encoding (hereinafter referred to as "entropy encoding method"), a syntax element for representing a video signal is binarized and transformed into a bin string. Then, adaptive binary arithmetic coding (hereinafter referred to as "binary arithmetic coding") is performed on each bin of the bin string to generate a bitstream. The syntax element may include information related to splitting and prediction of a current block, a signal generated by transforming/quantizing a residual signal for the current block, a difference signal, and information related to the quantized signal.

In order to perform coding on each bin of the input bin string, the binary arithmetic coding may be executed based on at least one of the bit depth of the coding signal, information on the splitting of probability ranges according to the bit depth, and status information about the current binary arithmetic coding process in a split probability range, syntax elements, the LPS (MPS) of each bin of the string, or probability information about the LPS (MPS) of each bin. In the binary arithmetic coding process after the binarization, a probability range including a bin to be encoded may be determined in the current probability range using the probability information about the LPS (MPS) and LPS (MPS) of the bin encoded based on the above-described information. When the probability range of a bin to be encoded is determined, state information about the binary arithmetic coding process may be updated in the split probability range based on context information about the corresponding bin. That is, context information such as probability information about the LPS (MPS) of a bin to be encoded may be updated according to the binary arithmetic coding method. The update of the context information of the bin to be encoded may be executed based on one or more of a syntax element subjected to binary arithmetic coding without additional information according to an agreement between the video encoding apparatus and the video decoding apparatus, and index information about each bin in the bin string obtained by binarizing the syntax element.

In another embodiment of the present disclosure, fixed values may be applied as probabilities of LPS (MPS) and LPS (MPS) to bins for which context information is not updated. For example, the LPS of all bins for which context information is not updated in the bin string may be fixed to 1, and the probability value for the LPS may be fixed to ½. The fixed probability value of the LPS may be set to ½, ¼, ⅜, or the like, and various probability values whose denominator can be expressed as a power of 2 may be used. Alternatively, the probability of the LPS (MPS) and LPS (MPS) may be encoded using a table having indexes, the table may be transmitted to the video decoding apparatus, and binary arithmetic decoding may be executed based on the transmitted information.

Figure 8:
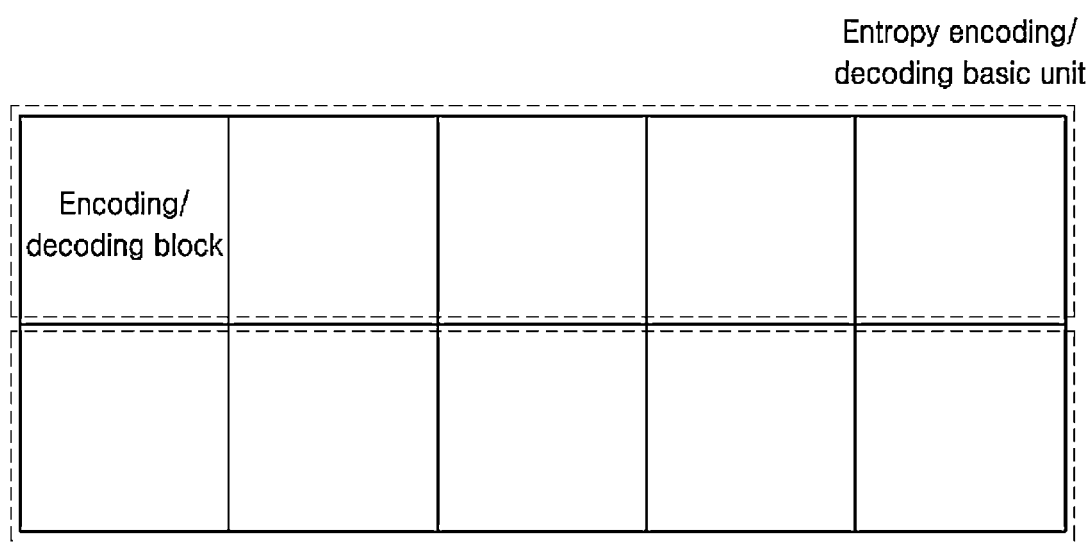
FIG. 8 is an exemplary diagram of a basic unit of entropy encoding including a coding block.

In executing the process of binarization and binary arithmetic coding, the entropy encoder 155 of the video encoding apparatus may perform entropy encoding using an entropy encoding method limited by the basic unit of entropy encoding (see FIG. 8) including encoding blocks. The entropy encoder 155 transmits a list of entropy encoding methods using high level information, and transmits an index of the list in the basic unit of entropy encoding. In addition, the entropy encoder 155 performs entropy encoding using an entropy encoding method designated to a corresponding index in a encoding block within the basic unit of entropy encoding. The basic unit of entropy encoding may include one or more encoding blocks. The entropy encoding methods may be one or more, K (where K is a natural number). When K is 2, the entropy encoding methods may be a 1-bit flag. In addition, when K is 1, one entropy encoding method is provided, and therefore information on the list index may be omitted, and a fixed method may be used as the entropy encoding method according to an agreement between the video encoding apparatus and the video decoding apparatus.

In one aspect of the present disclosure, binary arithmetic coding may be skipped among entropy encoding methods. In executing an entropy encoding method, the entropy encoder 155 may output corresponding information as a bitstream, skipping binary arithmetic coding on the binarization result. In addition, a method of skipping the binary arithmetic coding may be included in the list of entropy encoding methods described above. A list including skipping of the binary arithmetic coding as a first method for entropy encoding, first binary arithmetic coding as a second method, and second binary arithmetic coding as a third method may be formed. There may be one or more, J binary arithmetic coding methods (where J is a natural number), and there may be K entropy encoding methods according to the J binary arithmetic coding methods. K may be greater than or equal to J. In addition, when K is 2, in the entropy encoding methods, the binary arithmetic coding method may be turned on/off using a 1-bit flag. When K is 1, there is only one entropy encoding method, and accordingly information on the list index may be omitted, and a fixed method according to an agreement between the video encoding apparatus and the video decoding apparatus may be used as the entropy encoding method.

In the present disclosure, one entropy encoding method may be configured with a combination of various binarization methods and binary arithmetic coding methods. In this case, the number K of encoding methods included in the list of entropy encoding methods may be the maximum number of combinations between the binarization methods and the binary arithmetic coding method. Also, a specific binarization method may be combined with a specific binary arithmetic coding method. After the configuration of the list is determined, the list may be transmitted from the video encoding apparatus to the video decoding apparatus, or the configuration of the list may be determined according to an agreement between the video encoding apparatus and the video decoding apparatus. Also, the binarization method may differ between the case where binary arithmetic coding is skipped and the case where binary arithmetic coding is performed.

Detailed information on the binarization method may be derived at the video decoding apparatus according to an agreement between the video encoding apparatus and the video decoding apparatus without additional information transmitted. Also, part of the index information may be transmitted to the video decoding apparatus, then full information on the binarization method may be derived.

In the entropy encoding method according to the present disclosure, information on a binary arithmetic coding method transmitted at the high level may include at least one of context information about a bin after binarization of each syntax element for encoding, and indication about whether to update context information such as MPS of the bin and probability information about the MPS, a size of a probability update window for updating a probability range, and a probability of the LPS (MPS) of the bin. A binary arithmetic coding method is characterized by context information about a bin after binarization of each syntax element, and the update configuration of the context information such as the MPS of the bin and probability information about the MPS, the size of the probability update window for updating the probability, and the probability of the LPS (MPS) of the bin. Multiple binary arithmetic coding methods constitute a list.

Accordingly, depending on the binary arithmetic coding method used by a bin to be encoded, whether to update the context such as the probability update window size, MPS and initial probability information about the MPS, and probability information about the LPS (MPS) of the bin may be discriminated. For example, when the MPS of a bin indicated as '0' is 1, the probability of the MPS is ¾, and the update of the context such as probability information about the LPS (MPS) of the bin is not executed, the corresponding bin is 0 and is not MPS, but the probability for the MPS may be maintained as ¾ without update of the context such as the probability information about the LPS (MPS) of the bin, and then encoding may be performed.

Also, whether to update the context of the bin or bins may be determined according to an agreement between the video encoding apparatus and the video decoding apparatus. Accordingly, when an agreement on skipping update of the context for a specific syntax element or a specific bin of the specific syntax element is made between the video encoding apparatus and the video decoding apparatus, the context may be unconditionally updated for the remaining bins.

For encoding efficiency, the probability information on the MPS may be indicated as probability information on the LPS and transmitted, and may be derived as "probability information of 1-LPS" by the video decoding apparatus.

In an entropy encoding method according to the present disclosure, a method of performing binary arithmetic coding on bins after binarization without context update may be set as a separate binary arithmetic coding method. In this method, binary arithmetic coding is performed using only the MPS for the bin and the probability information about the MPS after binarization, and may be repeatedly performed without context update. Therefore, such a binary arithmetic coding method may be defined by the MPS and MPS probability information of each bin for each syntax element. That is, each bin for each syntax element may have independent MPS and MPS probability information, or may have the same MPS and MPS probability information. Alternatively, only one of the MPS and the probability information about the MPS may be the same.

When both the MPS and the MPS probability information of each bin for each syntax element are the same, the video encoding apparatus may directly transmits one combination of MPS and MPS probability information to the video decoding apparatus, or may transmit derivable information to allow the video decoding apparatus to drive the same. In addition, when each bin of each syntax element has an independent combination, the video encoding apparatus may directly transmit each combination to the video decoding apparatus, or may transmit derivable information to allow the video decoding apparatus to derive the combination. In addition, when the MPSs are all the same and the probability information about the MPSs is not the same, the video encoding apparatus may transmit one MPS and the probability information for each bin of each syntax element directly to the video decoding apparatus, or may transmit derivable information to allow the video decoding apparatus to derive the same.

In the entropy encoding method according to the present disclosure, information on a list component of the binary arithmetic coding method may be transmitted from the video encoding apparatus to the video decoding apparatus using a high-level syntax element. In the video encoding/decoding structure, the high-level syntax element may be transmitted at a level having a split concept higher than the entropy encoding unit, or transmitted at one of levels such as VPS, SPS, PPS, APS, or SEI message. The higher split concept may mean a unit into which one picture is split, and may be a set of blocks such as a subpicture, a tile group, a tile, a slice, a brick, or the like, and a set of pixels such as a grid.

In the entropy encoding method according to the present disclosure, the probability value of the initial MPS, the size of the probability range update window, and a range division depth for dividing a normalized value between 0 and 0.5 into probability ranges may be expressed in an exponential form of k. As provided herein, k may be a positive integer greater than or equal to 2, and the exponents p, q, and r may be non-zero integers. At least one of the exponents p, q, and r may be signaled from the video encoding apparatus to the video decoding apparatus. The video encoding/decoding apparatus may derive a start probability of an initial MPS and a value of an update window using the exponents p, q, r and k. For example, when k is 2, the probability exponent p of the MPS is 3, the window size exponent q is 1, and the range depth exponent r is 7, the probability range between 0 and 0.5 is divided into (0 to 127) corresponding to $2^7$, the initial probability position of the MPS is 8, which is the position of $2^3$, and the probability range is updated in units of $2^1$. When this is expressed as a normalized value between 0 and 0.5, the initial probability of the MPS may be ⅟16, and the probability update may be performed in units of ⅟128.

In addition, the depth of the split section, the size of the update window, and the MPS and the probability information about the MPS may be transmitted in the form of a table having indices. Information on the binary arithmetic coding method according to the present disclosure may be indicated by transmitting an index corresponding to each bin in the bin string of each syntax element.

In the entropy encoding method according to the present disclosure, the entropy encoder 155 may have a list memory to store state information about binary arithmetic coding. According to a binary arithmetic coding method applied in a basic unit of entropy encoding including an encoding block (see FIG. 8), the entropy encoder 155 performs binary arithmetic coding after binarization of the encoding block. When a binary arithmetic coding method of a basic unit of entropy encoding of a block to be encoded executes binary arithmetic coding after binarization, probability information that is an execution result may be stored. Since the N binary arithmetic coding methods constitute a list, the storage and management of the memory is also performed according to the index of the binary arithmetic coding method list. The stored probability information may be used and updated when the same binary arithmetic coding method is applied later. The application of the same binary arithmetic coding method includes the same basic unit of entropy encoding, and may include a case where the unit is not the same basic unit of entropy encoding. Accordingly, the stored probability information may be stored and used even after encoding of one basic unit of entropy encoding is finished.

In addition, initialization for binary arithmetic coding may be performed for each entropy encoding unit. In this case, after probability information is stored and managed in one entropy encoding unit, the stored information may be initialized when one entropy encoding is finished. In addition, when initialization for binary arithmetic coding is performed in every entropy encoding unit, probability information may be stored and managed using one memory in the basic unit of entropy encoding.

Hereinafter, a method for entropy decoding performed by the video decoding apparatus (hereinafter, "entropy decoding method") for a bitstream generated by the video encoding apparatus according to the entropy encoding method as described above will be described.

Figure 9:
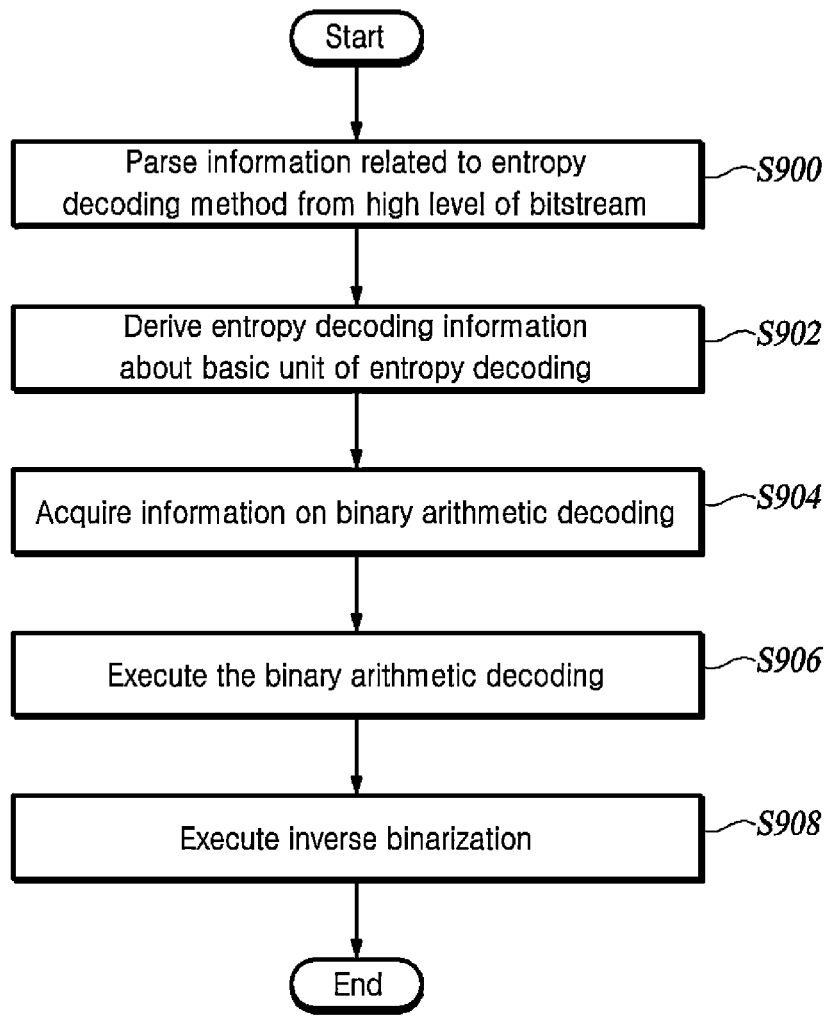
FIG. 9 is a flowchart of a method for entropy decoding according to another embodiment of the present disclosure.

FIG. 9 is a flowchart of a method for entropy decoding according to another embodiment of the present disclosure.

The entropy decoder 510 parses information related to the entropy decoding method included in the high level of the bitstream (S900). The parsed information may be stored in an associated memory.

The entropy decoder 510 derives entropy decoding information about a basic unit of entropy decoding (S902).

Based on the parsed high-level information, the entropy decoder 510 may derive information on the binary arithmetic coding method, the size of the basic unit of entropy decoding (see FIG. 8), the binary arithmetic coding method of the basic unit of entropy decoding, the binary arithmetic decoding method of the current decoding block according to the index, and the like. In addition, after the above-described information is derived in the basic unit of entropy decoding, additional information may be derived in a decoding block unit.

The entropy decoder 510 acquires information on binary arithmetic decoding (S904). Information on a binary arithmetic decoding method of a corresponding index may be acquired from a storage memory related to the binary arithmetic decoding.

The entropy decoder 510 executes binary arithmetic decoding depending on whether or not to execute the binary arithmetic decoding (S906), and executes inverse binarization (S908).

When the current decoding method of the basic unit of entropy decoding is a method that skips binary arithmetic decoding, the entropy decoder 510 may execute entropy decoding by inversely binarizing the value of the bitstream.

In the case of entropy decoding including inverse binarization, the entropy decoder 510 may generate an entropy decoding result by inverse binarization of a bin string. In the case of entropy decoding that does not include inverse binarization, the entropy decoder 510 may output a bin string as an entropy decoding result.

Hereinafter, a detailed description will be given of binary arithmetic decoding of each bin of a bitstream (operation S906), which is executed when the current decoding method of the basic unit of entropy decoding is a method that executes binary arithmetic decoding, with reference to FIG. 10.

Figure 10:
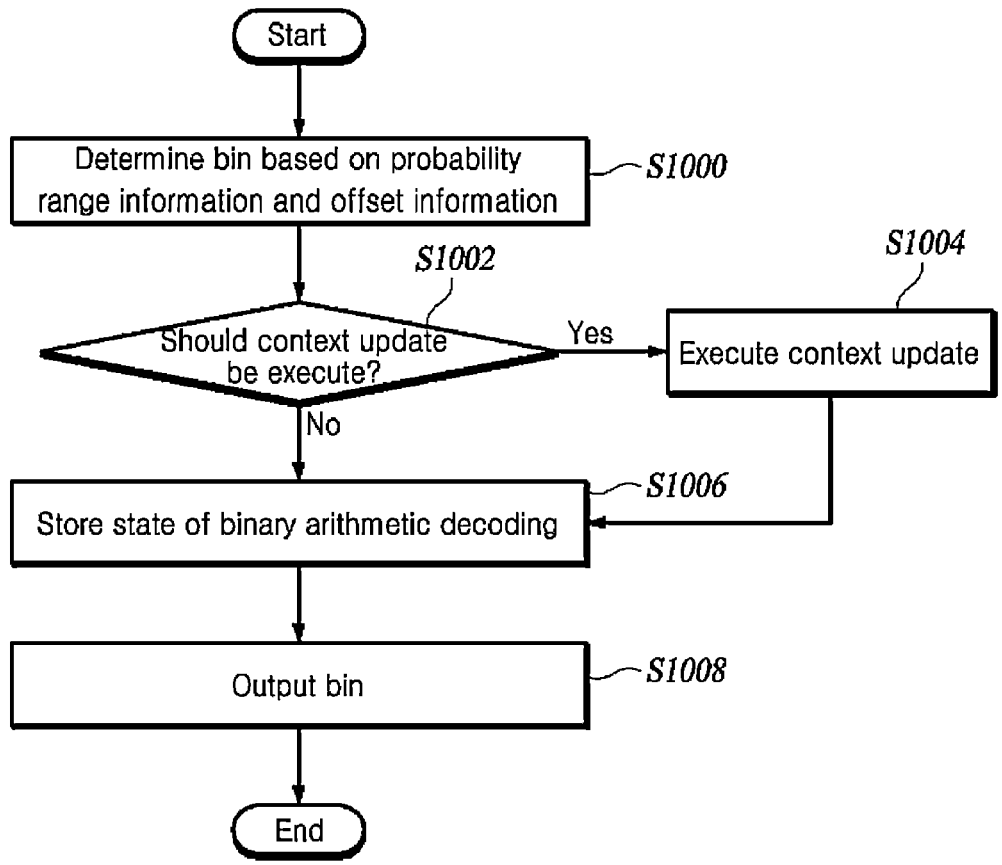
FIG. 10 is a flowchart of a binary arithmetic decoding process according to another embodiment of the present disclosure.

FIG. 10 is a flowchart of a binary arithmetic decoding process according to another embodiment of the present disclosure.

The entropy decoder 510 determines a bin based on the probability range information and offset information (S1000). Based on the probability range information and the offset information, the entropy decoder 510 may decide a range in which the decoded bin is included between the probability ranges of the LPS and the MPS, and determine a bin suitable for the corresponding range.

The entropy decoder 510 determines whether decoding on the bin is binary arithmetic decoding that executes context update or binary arithmetic decoding that skips update (S1002), and executes context update (S1004).

For simplicity of calculation, the context update may be executed using one or more of a method of changing the index for the table and using index mapping of the changed table, a method of directly updating a probability to be updated using an equation, a method of performing update using a shift operation, or a method of multiplying weights and performing a shift operation.

In addition, the context update may be executed using one or more of a method of applying to all bins according to an agreement between the video encoding/decoding apparatuses or binary arithmetic decoding information transmitted at the high level, a method of selective application to some bins according to an agreement between the video encoding/decoding apparatuses, or a method of selective application to each bin according to the binary arithmetic decoding information transmitted at the high level.

In context update, the probability information about the LPS and the MPS may be changed using one or more of a method of changing the index of a table according to an agreement between the video encoding/decoding apparatuses, a method of adding a preset probability value or multiplying or shifting a preset value according to an agreement between the video encoding/decoding apparatuses, or a method of adaptively adding a probability value to each bin or multiplying or shifting a preset value according to context information transmitted at the high level.

The entropy decoder 510 stores the state of binary arithmetic decoding (S1006) and outputs the determined bin (S1008).

A detailed execution process for the entropy decoding methods not described above may be performed using a method corresponding to the entropy encoding method described above.

In this embodiment, when an encoding/decoding method in which binary arithmetic coding/decoding is skipped is selected, entropy encoding/decoding may be adaptively executed according to information about a current encoding/decoding block. The adaptive execution means that a binary arithmetic coding/decoding method may be derived based on encoding/decoding information about the encoding/decoding block and neighboring blocks, independently from information specified in the basic unit of entropy encoding/decoding including the encoding/decoding block. When the number of entropy encoding list, K, is 1, and the binary arithmetic coding/decoding method in which the entropy encoding/decoding method applied in the basic unit of entropy encoding/decoding is skipped is used, the entropy encoding/decoding methods of the basic unit of entropy encoding may be all the same.

In addition, when a specific condition is satisfied depending on the size of the block currently being decoded, the prediction mode of the block, the MV accuracy of the block, the signal characteristics (luma/chroma) of the block, the split status of the block, the type of the transform kernel of the block, the status of second transform of the block, a quantization coefficient value of the block, a quantization matrix value of the block, the status of transform of the block, and the like, the entropy encoding/decoding method may be determined as a method in which the binary arithmetic coding/decoding is skipped. In this case, a specific skipped method may be a method that is not included in the transmission list of entropy encoding/decoding methods. This may be a method according to an agreement between the video encoding/decoding apparatuses, the video encoding/decoding apparatus may recognize the entropy encoding/decoding method without transmitted information.

For example, when the current decoding block has a maximum size that may be encoded/decoded without being split, the entropy encoding/decoding method of the block may be a method with skipped binary arithmetic coding/decoding. In addition, when the current decoding block is split into blocks of the minimum size, the entropy encoding/decoding method of the block may be a method with skipped binary arithmetic coding/decoding. The foregoing is an example of a specific condition, and various embodiments may be possible according to a situation in which such a specific condition may be derived.

As described above, according to the present disclosure, in entropy encoding and decoding related to generation and parsing of a bitstream, a method of configuring a list including various entropy encoding/decoding methods and adaptively using the entropy encoding/decoding method for each basic unit of entropy encoding/decoding is provided. Accordingly, entropy encoding/decoding may be performed according to applications and characteristics of a signal.

While it is illustrated in each flowchart according to the present embodiment that the respective operations are sequentially executed, embodiments are not limited thereto. In other words, change of the operations in execution or parallel execution of one or more operations may be applicable, and therefore the flowcharts are not limited to a time series order.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. An apparatus for entropy decoding video data, the apparatus comprising at least one processor configured to:
  receive a bitstream that has been generated by encoding a picture;
  perform an arithmetic decoding process to generate at least one bin string each including at least one bin by decoding the bitstream; and
  generate a syntax element through inverse binarization of the bin string,
  wherein the number of bins generated by decoding the bitstream satisfies a constraint that the number does not exceed a threshold,
  wherein the threshold is a value calculated based on a size of the picture, a sampling ratio between a luma component and a chroma component, and a bit depth, and
  wherein the threshold is variably set according to a tier or level of a video.

2. The apparatus of claim 1, wherein in order to satisfy a constraint that the number of bins does not exceed the threshold, the processor is configured to perform the arithmetic decoding process comprising:
  increasing a counter by N per bit read and decrementing the counter by M according to occurrence of one bin, wherein M and N are natural numbers and are determined based on the threshold; and
  selectively performing context-based adaptive binary arithmetic decoding or uniform probability-based binary arithmetic decoding depending on whether the counter is greater than N.

3. The apparatus of claim 1, wherein the processor is configured to perform the arithmetic decoding process comprising:
  generating a detailed section from a current section for decoding;
  obtaining a current probability value for a most probable symbol (MPS) using a first context model and a second context model for each of the syntax element, and generating an MPS value;
  calculating a length of a section of a least probable symbol (LPS) using the detailed section and the MPS value, and updating the current section using the length of the section of the LPS;
  generating one bin using an offset of a preset length acquired from the bitstream and the updated current section, and re-adjusting, when a value of the LPS is determined as the one bin, the offset and the current section, wherein the value of the LPS is generated from a value of the MPS;
  updating the first context model and the second context model; and
  when the readjusted current section is less than a preset threshold, renormalizing the current section and the offset.

4. The apparatus of claim 3, wherein the updating of the first context model and the second context model comprises:
  calculating a first adaptation rate and a second adaptation rate for each of the syntax element; and
  updating the first context model using the first adaptation rate and updating the second context model using the second adaptation rate,
  wherein the first context model is clipped to a maximum possible value of a probability of the first context model, and the second context model is clipped to a maximum possible value of a probability of the second context model.

5. An apparatus for entropy encoding syntax elements generated according to predictive encoding of each block constituting a picture, the apparatus comprising at least one processor configured to:
  binarize each of the syntax elements and generating at least one bin string each including at least one bin;
  perform an arithmetic coding process to generate encoded data from the bin string; and
  generate a bitstream comprised of one or more network abstraction layer (NAL) units from the encoded data,
  wherein the number of bins relative to a length of the one or more NAL units is constrained not to exceed a threshold,
  wherein the threshold is a value calculated based on a size of the picture, a sampling ratio between a luma component and a chroma component, and a bit depth,
  wherein the threshold is variably set according to a tier or level of an image.

6. The apparatus of claim 5, wherein when the number of bins relative to the length of the one or more NAL units exceeds the threshold, each of the one or more NAL units is configured by inserting one or more zero words of a predefined length.

7. The apparatus of claim 5, wherein in order to satisfy a constraint that the number of bins does not exceed the threshold, the processor is configured to perform the arithmetic coding process comprising:

increasing a counter by N per bit and decrementing the counter by M per bin, wherein M and N are natural numbers and are determined based on the threshold; and selectively performing context-based adaptive binary arithmetic coding or uniform probability-based binary arithmetic coding depending on whether the counter is greater than N.

8. An apparatus for transmitting a bitstream containing encoded video data, the apparatus comprising at least one processor configured to:

generate the bitstream by encoding syntax elements generated according to predictive encoding for each block constituting a picture; and transmit the bitstream to a video decoding apparatus, wherein generating the bitstream comprises:

binarizing each of the syntax elements to generate at least one bin string each including at least one bin;

performing an arithmetic coding process to generate encoded data from the bin string; and generating a bitstream comprised of one or more network abstraction layer (NAL) units from the encoded data, wherein the number of bins relative to a length of the one or more NAL units is constrained not to exceed a threshold, wherein the threshold is a value calculated based on a size of the picture, a sampling ratio between a luma component and a chroma component, and a bit depth, wherein the threshold is variably set according to a tier or level of an image.

\* \* \* \* \*